June 30, 1936. J. J. DUNNE ET AL 2,046,109
ROTARY MIXER
Filed June 6, 1935
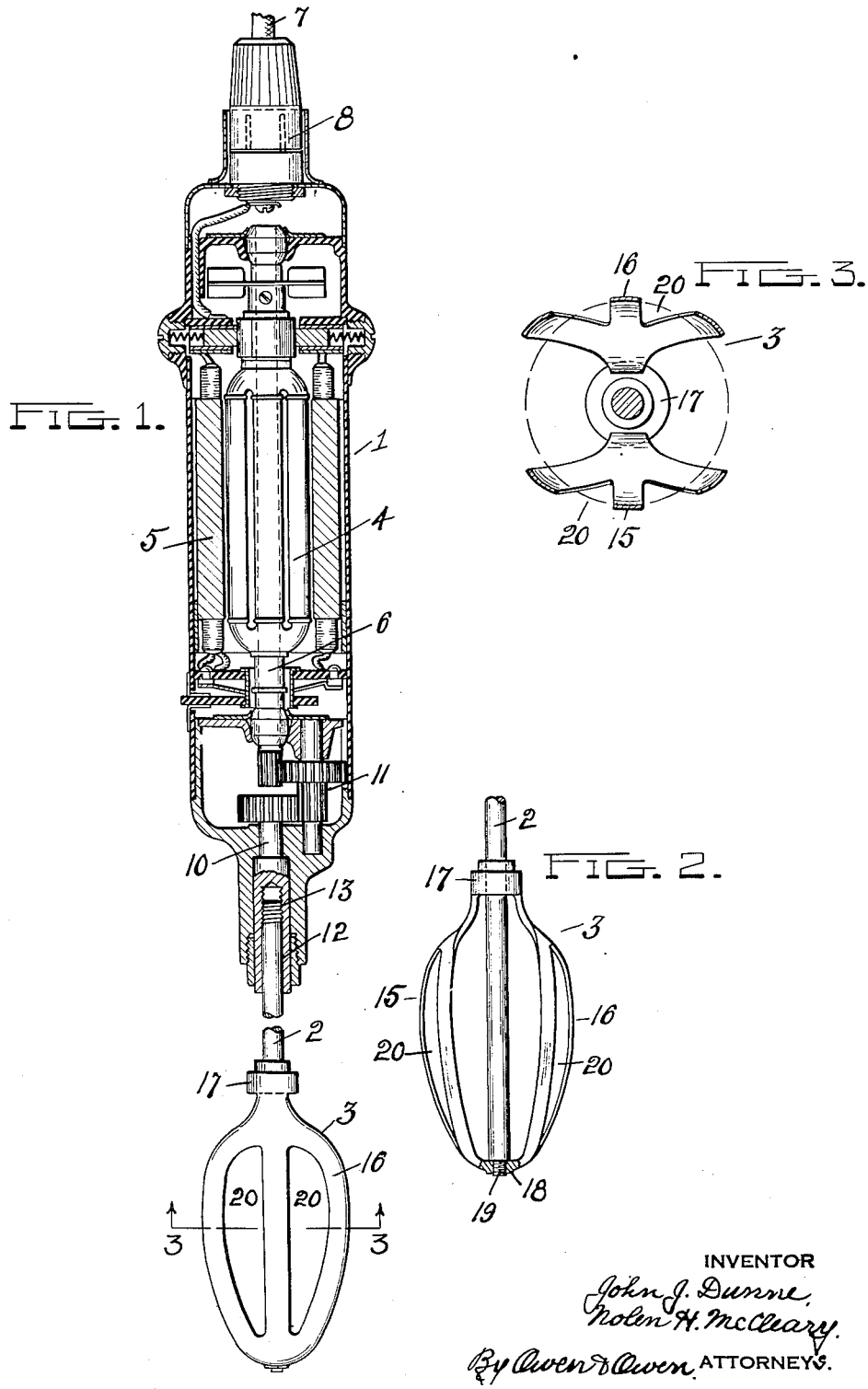
INVENTOR
John J. Dunne,
Nolen H. McCleary.
By Owen & Owen ATTORNEYS.

Patented June 30, 1936

2,046,109

UNITED STATES PATENT OFFICE 2,046,109

ROTARY MIXER

John J. Dunne and Nolen H. McCleary, Chicago, Ill.

Application June 6, 1935, Serial No. 25,277

3 Claims. (Cl. 259—129)

This invention relates to mixing devices for batters, eggs, beverages, or the like, and has for its object the provision of a simple, efficient and improved mixer of this character, which, while its beater element is electrically operated, is adapted to be manipulated by hand in the manner of a spoon to effect a thorough beating and mixing of a batter or the like in all parts of a bowl in which contained.

Another object of the invention is the provision of a novel form of beating element for mixers of this class, whereby a rapid and efficient beating of the liquid or semi-liquid contents of a bowl, or other receptacle, may be freely and rapidly mixed or beaten, and which is also capable of effective use as a hand beater.

The invention is fully described in the following specification, and while in its broader aspect it is capable of embodiment in different forms, one embodiment thereof is illustrated in the accompanying drawing, in which—

Figure 1 is a side elevation of a device embodying the invention with the handle and a portion of the enclosed motor parts in central longitudinal section; Fig. 2 is a different side elevation of the beater element of the device, and Fig. 3 is a cross-section of the beater element taken on the line 3—3 in Fig. 1.

Referring to the drawing, 1 designates a handle of elongated form, to facilitate holding in the hand of an operator, 2 a stem projecting longitudinally from one end thereof and 3 a beater element attached to the end of the stem.

The handle is hollow and encloses an electric motor of which 4 is the armature and 5 the field. The armature shaft 6 is disposed lengthwise of the handle axially thereof and has suitable mounting at opposite ends in the handle. Electric current is applied to the motor at the rear end of the handle through a cable 7 and detachable connection 8.

The inner end of the handle 1 has a shaft 10 mounted therein and projecting therethrough in axial alignment with the armature shaft, and its inner end is connected to the armature shaft through a reduction gearing 11. The outer end of the shaft 10, in the present instance, is provided with an axial socket 12 adapted to receive the inner end of the beater stem 2 and in which it is detachably threaded, as at 13.

The beater element 3 preferably comprises two opposed members 15 and 16 of tablespoon bowl shape with their dished or concaved sides facing each other and with their inner or shank ends connected together near the bowls by a collar 17 through which the stem 2 may be freely projected. These two members are joined at their tip ends by a connection 18, which is centrally apertured to threadingly receive the reduced threaded end of a stud portion 19 of the stem 2, so that the beater will turn with the stem during an operation of the device. Each beater member preferably has openings 20 therein in the form of longitudinally extending slots, such slots, in the present instance, being two in number, with a centrally disposed rib-like portion of the bowl body therebetween.

The cross-sectional form of each bowl member, at least at its central portion, and throughout the major portion of its length is eccentric to the stem axis, so that the portions at the outer sides of the slots 20 deflect the mixture material with which they come in contact during a rotation of the beater. The action is such that when the forward edge portion of a beater member, in its beating action, cuts the material, it effects an inner deflection thereof, while the following or opposite edge portion of the member, in cutting the material, deflects it outwardly, as is apparent by reference to Fig. 3.

It is found, in practice, that by the use of a rotary beater having a single tablespoon shaped beating member, which is positioned with respect to the axis of rotation of the beater as shown by either spoon member in the drawing, a very efficient beating and mixing action is obtained. It is also found that the efficiency of the beater is enhanced if it is composed of two opposed tablespoon shaped members, as shown in the drawing, and it is further found that in either case, if the spoon members are slotted substantially as shown, the efficiency is materially augmented. In the latter case, the deflection of the mixture by the eccentric edge portions of the spoon members in combination with currents set up by the passage of portions of the mixture through the slots, effects a highly efficient mixing of the material in a shorter time than is the case if such slots are omitted.

It is further found, in practice, that the mixing device comprising our invention may be used to very good advantage in the manner of a beating spoon, and without operating the motor, or in other words with the beater stationary, so far as rotation of its shaft axis is concerned.

We wish it understood that our invention is not limited to any specific construction, arrangement or form of the parts, as it is capable of numerous modifications and changes without departing from the spirit of the claims.

Having thus described our invention, what we claim as new, and desire to secure by United States Letters Patent, is:

1. In a mixer of the class described, a rotary beater having a bowl like beater member of tablespoon shape disposed with its major axis lengthwise of its axis of rotation and offset therefrom with its concaved side facing inwardly, said member having a longitudinally extending opening therein at each side of its longitudinally extending center line.

2. In a mixer of the class described, a rotary beater having two bowl like beater members of true tablespoon form in cross-section disposed with their major axes lengthwise of the axis of rotation and equi-distantly offset from opposite sides thereof with their concaved sides facing each other, at least one of said members having lengthwise extending openings therein.

3. In a mixer of the class described, a rotary beater having two bowl like beater members of true tablespoon form in cross-section disposed with their major axes lengthwise of the axis of rotation and equi-distantly offset from opposite sides thereof with their concaved sides facing each other, at least one of said members having lengthwise extending openings therein, the portions of the member at the outer sides of the openings being eccentric to the axis of rotation to present deflecting surfaces for the contacted material.

JOHN J. DUNNE.
NOLEN H. McCLEARY.